(12) United States Patent
Vanderbilt et al.

(10) Patent No.: US 8,631,631 B2
(45) Date of Patent: Jan. 21, 2014

(54) PACKAGING SOLUTIONS

(75) Inventors: David Paul Vanderbilt, Webster, NY (US); Paul L. Valint, Jr., Pittsford, NY (US)

(73) Assignee: Bausch & Lomb Incorporated, Rochester, NY (US)

(*) Notice: Subject to any disclaimer, the term of this patent is extended or adjusted under 35 U.S.C. 154(b) by 543 days.

(21) Appl. No.: 12/641,434

(22) Filed: Dec. 18, 2009

(65) Prior Publication Data

US 2010/0162661 A1 Jul. 1, 2010

Related U.S. Application Data

(60) Provisional application No. 61/203,886, filed on Dec. 30, 2008.

(51) Int. Cl.
*B65B 25/00* (2006.01)
*B65B 55/02* (2006.01)

(52) U.S. Cl.
USPC ............ 53/425; 53/431; 206/5.1; 422/28

(58) Field of Classification Search
CPC ........ B65B 25/008; B65B 55/02; B65B 55/22
USPC .......... 53/425, 431, 471; 206/5.1; 422/25, 28, 422/40
See application file for complete search history.

(56) References Cited

U.S. PATENT DOCUMENTS

| | | | |
|---|---|---|---|
| 3,408,429 A | 10/1968 | Wichterle | |
| 3,660,545 A | 5/1972 | Wichterle | |
| 4,113,224 A | 9/1978 | Clark et al. | |
| 4,136,250 A | 1/1979 | Mueller et al. | |
| 4,143,949 A | 3/1979 | Chen | |
| 4,153,641 A | 5/1979 | Deicherte et al. | |
| 4,197,266 A | 4/1980 | Clark et al. | |
| 4,312,575 A | 1/1982 | Peyman et al. | |
| 4,555,732 A | 11/1985 | Tuhro | |
| 4,740,533 A | 4/1988 | Su et al. | |
| 4,786,436 A | 11/1988 | Ogunbiyi et al. | |
| 4,910,277 A | 3/1990 | Bambury et al. | |
| 4,954,587 A | 9/1990 | Mueller | |
| 5,010,141 A | 4/1991 | Mueller | |
| 5,034,461 A | 7/1991 | Lai et al. | |
| 5,070,215 A | 12/1991 | Bambury et al. | |
| 5,079,319 A | 1/1992 | Mueller | |
| 5,209,865 A | 5/1993 | Winterton et al. | |
| 5,260,000 A | 11/1993 | Nandu et al. | |
| 5,271,875 A | 12/1993 | Appleton et al. | |
| 5,310,779 A | 5/1994 | Lai | |
| 5,321,108 A | 6/1994 | Kunzler et al. | |
| 5,358,995 A | 10/1994 | Lai et al. | |
| 5,387,662 A | 2/1995 | Kunzler et al. | |
| 5,449,729 A | 9/1995 | Lai | |
| 5,464,667 A | 11/1995 | Kohler et al. | |
| 5,512,205 A | 4/1996 | Lai | |
| 5,610,252 A | 3/1997 | Bambury et al. | |
| 5,616,757 A | 4/1997 | Bambury et al. | |
| 5,708,094 A | 1/1998 | Lai et al. | |
| 5,710,302 A | 1/1998 | Kunzler et al. | |
| 5,714,557 A | 2/1998 | Kunzler et al. | |
| 5,908,906 A | 6/1999 | Kunzler et al. | |
| 6,440,366 B1 | 8/2002 | Salpekar et al. | |
| 8,419,792 B2 * | 4/2013 | Vanderbilt et al. | 623/6.62 |
| 8,454,689 B2 * | 6/2013 | Vanderbilt et al. | 623/6.62 |
| 8,534,031 B2 * | 9/2013 | McGee et al. | 53/431 |
| 2003/0185787 A1 * | 10/2003 | Hubbell et al. | 424/78.08 |
| 2005/0203256 A1 * | 9/2005 | Destarac et al. | 525/337 |
| 2007/0116740 A1 * | 5/2007 | Valint, Jr. et al. | 424/428 |
| 2008/0110770 A1 * | 5/2008 | Burke et al. | 53/425 |
| 2008/0141628 A1 * | 6/2008 | Lang et al. | 53/425 |
| 2008/0151180 A1 * | 6/2008 | Vanderbilt et al. | 351/160 R |
| 2008/0152540 A1 * | 6/2008 | Schorzman et al. | 422/40 |

FOREIGN PATENT DOCUMENTS

| | | |
|---|---|---|
| WO | WO 94/06485 | 3/1994 |
| WO | WO 96/31792 | 10/1996 |
| WO | WO03/095502 | 11/2003 |
| WO | WO2007/061919 | 5/2007 |

OTHER PUBLICATIONS

International Search Report (PCT/ISA/210) and Written Opinion (PCT/ISA/237) mailed on Mar. 16, 2010, 9 pages.
Kahraman, G. et al. "Bioengineering polyfunctional copolymers." Polymer, Elsevier Science Publishers, vol. 45, No. 17, pp. 5813-5828, Aug. 5, 2004.
Lai, Yu-Chin, "The Role of Bulky Polysiloxanylalkyl Methacrylates in Polyurethane-Polysiloxane Hydrogels," Journal of Applied Polymer Science, vol. 60, 1193-1199 (1996).
A. T. Bell, Proc. Intl. Conf. Phenom. Ioniz. Gases, "*Chemical Reaction in Nonequilibrium Plasmas*", 19-33 (1977).
J. M. Tibbitt, R. Jensen, A. T. Bell, M. Shen, Macromolecules, "A Model for the Kinetics of Plasma Polymerization", 3, 648-653 (1977).
J. M. Tibbitt, M. Shen, A. T. Bell, J. Macromol. Sci.-Chem., "*Structural Characterization of Plasma-Polymerized Hydrocarbons*", A10, 1623-1648 (1976).
C. P. Ho, H. Yasuda, J. Biomed, Mater. Res., "*Ultrathin coating of plasma polymer of methane applied on the surface of silicone contact lenses*", 22, 919-937 (1988).
H. Kobayashi, A. T. Bell, M. Shen, Macromolecules, "*Plasma Polymerization of Saturated and Unsaturated Hydrocarbons*", 3, 277-283 (1974).
H. Yasuda, H. C. Marsh, M. O. Bumgarner, N. Morosoff, J. of Appl. Poly. Sci., "*Polymerization of Organic Compounds in an Electroless Glow Discharge. VI. Acetylene with Unusual Co-monomers*", 19, 2845-2858 (1975).

* cited by examiner

*Primary Examiner* — Stephen F Gerrity
(74) *Attorney, Agent, or Firm* — Toan P. Vo; Glenn D. Smith

(57) ABSTRACT

Packaging systems for storing ophthalmic devices such as contact lenses and to methods for packaging such ophthalmic devices with solutions to improve the comfort of the lenses during wear are disclosed. A packaging system includes an ophthalmic device stored in an aqueous packaging solution comprising a brush copolymer comprising (a) monomeric units derived from an ethylenically unsaturated monomer containing one or more boronic acid moieties; and (b) monomeric units derived from an ethylenically unsaturated-containing hydrophilic macromonomer.

20 Claims, No Drawings

PACKAGING SOLUTIONS

This application claims the benefit of Provisional Patent Application No. 61/203,886 filed Dec. 30, 2008 which is incorporated by reference herein.

BACKGROUND OF THE INVENTION

1. Technical Field

The present invention generally relates to packaging solutions for ophthalmic devices such as contact lenses.

2. Description of Related Art

Blister-packs and glass vials are typically used to individually package each soft contact lens for sale to a customer. Saline or deionized water is commonly used to store the lens in the blister-packs, as mentioned in various patents related to the packaging or manufacturing of contact lenses. Because lens material may tend to stick to itself and to the lens package, packaging solutions for blister-packs have sometimes been formulated to reduce or eliminate lens folding and sticking. For this reason, polyvinyl alcohol (PVA) has been used in contact-lens packaging solutions.

It has been stated that if a lens is thoroughly cleaned before insertion, lacrimal fluid can adequately wet the lens. Furthermore, the difficulties of adding a surfactant to a packaging solution, including the possibility of lowering shelf-life and/or adverse reactions during heat sterilization, have further limited the use of surfactants in a packaging solution for the purpose of providing any possible or marginal effect on lens comfort. It is only after a lens has been worn, when proteins or other deposits have formed on the surface of the lens, that surfactants have been used in standard lens-care solutions.

It is highly desirable that contact lens be as comfortable as possible for wearers. Manufacturers of contact lenses are continually working to improve the comfort of the lenses. Nevertheless, many people who wear contact lenses still experience dryness or eye irritation throughout the day and particularly towards the end of the day. An insufficiently wetted lens at any point in time will cause significant discomfort to the lens wearer. Although wetting drops can be used as needed to alleviate such discomfort, it would certainly be desirable if such discomfort did not arise in the first place.

Poloxamine and poloxamers are examples of non-ionic surfactants having one or more poly(oxyalkylene) chains. Poloxamines and poloxamaers are well-known wetting and lubricating agents for contact lenses and have been used in lens wetting drops and in lens-care solutions for treating lenses after use or while in use in the eye. For example, U.S. Pat. No. 4,786,436 disclose poloxamine as a wetting agent. Contact-lens rewetting drops containing surfactants such as poloxamine and poloxamer have been used to make contact lens wear more comfortable, to soothe the eyes, and to moisten lenses to minimize dryness. Surfactants such as poloxamine, poloxamer, and tyloxapol have been used in multi-purpose solutions, for cleaning, wetting, and storing lenses.

Certain combinations of poly(oxyalkylene) surfactants have also been disclosed for use in the eye to preventively clean lenses and inhibit deposits. For example, U.S. Pat. No. 5,209,865 discloses the combination of certain poloxamers and poloxamines to maintain clean lenses in the eye.

U.S. Pat. No. 6,440,366 ("the '366 patent") discloses a package containing a contact lens suitable for immediate use which comprises (a) a solution comprising a non-ionic surfactant that is a compound comprising at least 90 weight percent of poly(oxyethylene) and poly(oxypropylene) segments, in one or more block copolymer chains, and (b) an effective amount of a tonicity adjusting agent such that the solution has an osmolality of 200 to 400 mOsm/kg; wherein the solution has a pH of about 6 to 8 and is heat sterilized and lacks an effective disinfecting amount of a disinfecting agent. The '366 patent further discloses that the surfactant is a poly(oxypropylene)-poly(oxyethylene) adduct of ethylene diamine.

It would be desirable to provide an improved packaging system for ophthalmic devices such as a contact lens such that the lens would be comfortable to wear in actual use and allow for extended wear of the lens without irritation or other adverse effects to the cornea.

SUMMARY OF THE INVENTION

In accordance with one embodiment of the present invention, a method of preparing a package comprising a storable, sterile ophthalmic device is provided comprising:

(a) immersing an ophthalmic device in an aqueous packaging solution comprising a brush copolymer comprising (i) monomeric units derived from an ethylenically unsaturated monomer containing one or more boronic acid moieties; and (ii) monomeric units derived from an ethylenically unsaturated-containing hydrophilic macromonomer, wherein the solution has an osmolality of at least about 200 mOsm/kg and a pH in the range of about 6 to about 9;

(b) packaging the solution and the ophthalmic device in a manner preventing contamination of the device by microorganisms; and (c) sterilizing the packaged solution and ophthalmic device.

In accordance with a second embodiment of the present invention, a packaging system for the storage of an ophthalmic device is provided comprising a sealed container containing one or more unused ophthalmic devices immersed in an aqueous packaging solution comprising a brush copolymer comprising (i) monomeric units derived from an ethylenically unsaturated monomer containing one or more boronic acid moieties; and (ii) monomeric units derived from an ethylenically unsaturated-containing hydrophilic macromonomer, wherein the solution has an osmolality of at least about 200 mOsm/kg, a pH of about 6 to about 9 and is heat sterilized.

In accordance with a third embodiment of the present invention, a packaging system for the storage of an ophthalmic device is provided comprising:

(a) an aqueous packaging solution comprising a brush copolymer comprising (i) monomeric units derived from an ethylenically unsaturated monomer containing one or more boronic acid moieties; and (ii) monomeric units derived from an ethylenically unsaturated-containing hydrophilic macromonomer, wherein the solution has an osmolality of at least about 200 mOsm/kg and a pH in the range of about 6 to about 9;

(b) at least one ophthalmic device; and (c) a container for holding the solution and ophthalmic device sufficient to preserve the sterility of the solution and ophthalmic device, wherein the solution does not contain an effective disinfecting amount of a disinfecting agent.

The aqueous packaging solutions of the present invention containing a brush copolymer comprising (a) monomeric units derived from an ethylenically unsaturated monomer containing one or more boronic acid moieties; and (b) monomeric units derived from an ethylenically unsaturated-containing hydrophilic macromonomer is believed to provide an ophthalmic device such as a contact lens which is biocompatible and has improved wettability and/or lubriciousness.

Thus, the lens will be more comfortable to wear in actual use and would allow for the extended wear of the lens without irritation or other adverse effects to the cornea when removing the lens from the solution.

DETAILED DESCRIPTION OF THE PREFERRED EMBODIMENTS

The present invention provides a packaging system for the storage of ophthalmic devices intended for direct contact with body tissue or body fluid. As used herein, the term "ophthalmic device" refers to devices that reside in or on the eye. These lenses can provide optical correction, wound care, drug delivery, diagnostic functionality or cosmetic enhancement or effect or a combination of these properties. Representative examples of such devices include, but are not limited to, soft contact lenses, e.g., a soft, hydrogel lens; soft, non-hydrogel lens and the like, hard contact lenses, e.g., a hard, gas permeable lens material and the like, intraocular lenses, overlay lenses, ocular inserts, optical inserts and the like. As is understood by one skilled in the art, a lens is considered to be "soft" if it can be folded back upon itself without breaking. Any material known to produce an ophthalmic device including a contact lens can be used herein.

The ophthalmic devices can be any material known in the art capable of forming an ophthalmic device as described above. In one embodiment, an ophthalmic device includes devices which are formed from material not hydrophilic per se. Such devices are formed from materials known in the art and include, by way of example, polysiloxanes, perfluoropolyethers, fluorinated poly(meth)acrylates or equivalent fluorinated polymers derived, e.g., from other polymerizable carboxylic acids, polyalkyl(meth)acrylates or equivalent alkylester polymers derived from other polymerizable carboxylic acids, or fluorinated polyolefins, such as fluorinated ethylene propylene polymers, or tetrafluoroethylene, preferably in combination with a dioxol, e.g., perfluoro-2,2-dimethyl-1,3-dioxol. Representative examples of suitable bulk materials include, but are not limited to, Lotrafilcon A, Neofocon, Pasifocon, Telefocon, Silafocon, Fluorsilfocon, Paflufocon, Silafocon, Elastofilcon, Fluorofocon or Teflon AF materials, such as Teflon AF 1600 or Teflon AF 2400 which are copolymers of about 63 to about 73 mol % of perfluoro-2,2-dimethyl-1,3-dioxol and about 37 to about 27 mol % of tetrafluoroethylene, or of about 80 to about 90 mol % of perfluoro-2,2-dimethyl-1,3-dioxol and about 20 to about 10 mol % of tetrafluoroethylene.

In another embodiment, an ophthalmic device includes devices which are formed from material hydrophilic per se, since reactive groups, e.g., carboxy, carbamoyl, sulfate, sulfonate, phosphate, amine, ammonium or hydroxy groups, are inherently present in the material and therefore also at the surface of an ophthalmic device manufactured therefrom. Such devices are formed from materials known in the art and include, by way of example, polyhydroxyethyl acrylate, polyhydroxyethyl methacrylate (HEMA), polyvinyl pyrrolidone (PVP), polyacrylic acid, polymethacrylic acid, polyacrylamide, polydimethylacrylamide (DMA), polyvinyl alcohol and the like and copolymers thereof, e.g., from two or more monomers selected from hydroxyethyl acrylate, hydroxyethyl methacrylate, N-vinyl pyrrolidone, acrylic acid, methacrylic acid, acrylamide, dimethyl acrylamide, vinyl alcohol and the like. Representative examples of suitable bulk materials include, but are not limited to, Polymacon, Tefilcon, Methafilcon, Deltafilcon, Bufilcon, Phemfilcon, Ocufilcon, Focofilcon, Etafilcon, Hefilcon, Vifilcon, Tetrafilcon, Perfilcon, Droxifilcon, Dimefilcon, Isofilcon, Mafilcon, Nelfilcon, Atlafilcon and the like. Examples of other suitable bulk materials include balafilcon A, hilafilcon A, alphafilcon A, bilafilcon B and the like.

In another embodiment, ophthalmic devices include devices which are formed from material which are amphiphilic segmented copolymers containing at least one hydrophobic segment and at least one hydrophilic segment which are linked through a bond or a bridge member.

It is particularly useful to employ biocompatible materials herein including both soft and rigid materials commonly used for ophthalmic lenses, including contact lenses. In general, non-hydrogel materials are hydrophobic polymeric materials that do not contain water in their equilibrium state. Typical non-hydrogel materials comprise silicone acrylics, such as those formed bulky silicone monomer (e.g., tris(trimethylsiloxy)silylpropyl methacrylate, commonly known as "TRIS" monomer), methacrylate end-capped poly(dimethylsiloxane) prepolymer, or silicones having fluoroalkyl side groups (polysiloxanes are also commonly known as silicone polymers).

Hydrogels in general are a well-known class of materials that comprise hydrated, crosslinked polymeric systems containing water in an equilibrium state. Accordingly, hydrogels are copolymers prepared from hydrophilic monomers. In the case of silicone hydrogels, the hydrogel copolymers are generally prepared by polymerizing a mixture containing at least one device-forming silicone-containing monomer and at least one device-forming hydrophilic monomer. Either the silicone-containing monomer or the hydrophilic monomer can function as a crosslinking agent (a crosslinker being defined as a monomer having multiple polymerizable functionalities) or a separate crosslinker may be employed. Silicone hydrogels typically have a water content between about 10 to about 80 weight percent.

Representative examples of useful hydrophilic monomers include, but are not limited to, amides such as N,N-dimethylacrylamide and N,N-dimethylmethacrylamide; cyclic lactams such as N-vinyl-2-pyrrolidone; and (meth)acrylated poly(alkene glycols), such as poly(diethylene glycols) of varying chain length containing monomethacrylate or dimethacrylate end caps. Still further examples are the hydrophilic vinyl carbonate or vinyl carbamate monomers disclosed in U.S. Pat. No. 5,070,215, and the hydrophilic oxazolone monomers disclosed in U.S. Pat. No. 4,910,277, the disclosures of which are incorporated herein by reference. Other suitable hydrophilic monomers will be apparent to one skilled in the art. For example, 2-hydroxyethylmethacrylate (HEMA) is a well-known hydrophilic monomer that may be used in admixture with the aforementioned hydrophilic monomers.

The monomer mixtures may also include a second device-forming monomer including a copolymerizable group and a reactive functional group. The copolyermizable group is preferably an ethylenically unsaturated group, such that this device-forming monomer copolymerizes with the hydrophilic device-forming monomer and any other device-forming monomers in the initial device-forming monomer mixture. Additionally, the second monomer can include a reactive functional group that reacts with a complementary reactive group of the copolymer which is the reaction product of one or more polymerizable polyhydric alcohols and one or more polymerizable fluorine-containing monomers. In other words, after the device is formed by copolymerizing the device-forming monomer mixture, the reactive functional groups provided by the second device-forming monomers remain to react with a complementary reactive moiety of the copolymer.

Preferred reactive groups of the second device-forming monomers include epoxide groups. Accordingly, preferred second device-forming monomers are those that include both an ethylenically unsaturated group (that permits the monomer to copolymerize with the hydrophilic device-forming monomer) and the epoxide group (that does not react with the hydrophilic device-forming monomer but remains to react with the copolymer is the reaction product of one or more polymerizable polyhydric alcohols and one or more polymerizable fluorine-containing monomers). Examples include glycidyl methacrylate, glycidyl acrylate, glycidyl vinylcarbonate, glycidyl vinylcarbamate, 4-vinyl-1-cyclohexene-1,2-epoxide and the like.

As mentioned, one preferred class of ophthalmic device substrate materials are silicone hydrogels. In this case, the initial device-forming monomer mixture further comprises a silicone-containing monomer. Applicable silicone-containing monomeric materials for use in the formation of silicone hydrogels are well known in the art and numerous examples are provided in U.S. Pat. Nos. 4,136,250; 4,153,641; 4,740,533; 5,034,461; 5,070,215; 5,260,000; 5,310,779; and 5,358,995. Specific examples of suitable materials for use herein include those disclosed in U.S. Pat. Nos. 5,310,779; 5,387,662; 5,449,729; 5,512,205; 5,610,252; 5,616,757; 5,708,094; 5,710,302; 5,714,557 and 5,908,906, the contents of which are incorporated by reference herein.

Representative examples of applicable silicon-containing monomers include bulky polysiloxanylalkyl(meth)acrylic monomers. The term "monomer" and like terms as used herein denote relatively low molecular weight compounds that are polymerizable by, for example, free radical polymerization, as well as higher molecular weight compounds also referred to as "prepolymers", "macromonomers", and related terms. The term "(meth)" as used herein denotes an optional methyl substituent. Accordingly, terms such as "(meth)acrylate" denotes either methacrylate or acrylate, and "(meth) acrylic acid" denotes either methacrylic acid or acrylic acid.

An example of a bulky polysiloxanylalkyl(meth)acrylic monomer is represented by the structure of Formula I:

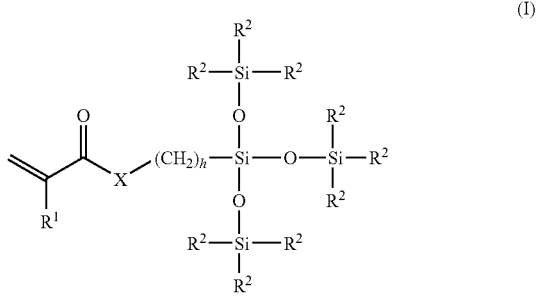

(I)

wherein X denotes —O— or —NR—; each $R^1$ independently denotes hydrogen or methyl; each $R^2$ independently denotes a lower alkyl radical, phenyl radical or a group represented by

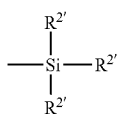

wherein each $R^{2'}$ independently denotes a lower alkyl or phenyl radical; and h is 1 to 10.

Examples of bulky monomers are methacryloxypropyl tris (trimethylsiloxy)silane or tris(trimethylsiloxy)silylpropyl methacrylate, sometimes referred to as TRIS and tris(trimethylsiloxy)silylpropyl vinyl carbamate, sometimes referred to as TRIS-VC and the like.

Such bulky monomers may be copolymerized with a silicone macromonomer, which is a poly(organosiloxane) capped with an unsaturated group at two or more ends of the molecule. U.S. Pat. No. 4,153,641 discloses, for example, various unsaturated groups such as acryloxy or methacryloxy groups.

Another class of representative silicone-containing monomers includes, but is not limited to, silicone-containing vinyl carbonate or vinyl carbamate monomers such as, for example, 1,3-bis[4-vinyloxycarbonyloxy)but-1-yl]tetramethyl-disiloxane; 3-(trimethylsilyl)propyl vinyl carbonate; 3-(vinyloxycarbonylthio)propyl-[tris(trimethylsiloxy)silane]; 3-[tris (trimethylsiloxy)silyl]propyl vinyl carbamate; 3-[tris (trimethylsiloxy)silyl]propyl allyl carbamate; 3-[tris (trimethylsiloxy)silyl]propyl vinyl carbonate; t-butyldimethylsiloxyethyl vinyl carbonate; trimethylsilylethyl vinyl carbonate; trimethylsilylmethyl vinyl carbonate and the like and mixtures thereof.

Another class of silicon-containing monomers includes polyurethane-polysiloxane macromonomers (also sometimes referred to as prepolymers), which may have hard-soft-hard blocks like traditional urethane elastomers. They may be end-capped with a hydrophilic monomer such as 2-hydroxyethyl methacrylate (HEMA). Examples of such silicone urethanes are disclosed in a variety or publications, including Lai, Yu-Chin, "The Role of Bulky Polysiloxanylalkyl Methacryates in Polyurethane-Polysiloxane Hydrogels," Journal of Applied Polymer Science, Vol. 60, 1193-1199 (1996). PCT Published Application No. WO 96/31792 discloses examples of such monomers, which disclosure is hereby incorporated by reference in its entirety. Further examples of silicone urethane monomers are represented by Formulae II and III:

$$E(*D*A*D*G)_a*D*A*D*E'; \text{ or} \qquad (II)$$

$$E(*D*G*D*A)_a*D*A*D*E'; \text{ or} \qquad (III)$$

wherein:

D independently denotes an alkyl diradical, an alkyl cycloalkyl diradical, a cycloalkyl diradical, an aryl diradical or an alkylaryl diradical having 6 to about 30 carbon atoms;

G independently denotes an alkyl diradical, a cycloalkyl diradical, an alkyl cycloalkyl diradical, an aryl diradical or an alkylaryl diradical having 1 to about 40 carbon atoms and which may contain ether, thio or amine linkages in the main chain;

* denotes a urethane or ureido linkage;

a is at least 1;

A independently denotes a divalent polymeric radical of Formula IV:

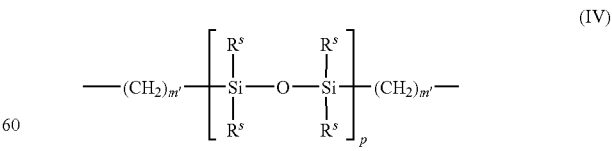

(IV)

wherein each $R^s$ independently denotes an alkyl or fluoro-substituted alkyl group having 1 to about 10 carbon atoms which may contain ether linkages between the carbon atoms; m' is at least 1; and p is a number that provides a moiety weight of about 400 to about 10,000;

each of E and E' independently denotes a polymerizable unsaturated organic radical represented by Formula V:

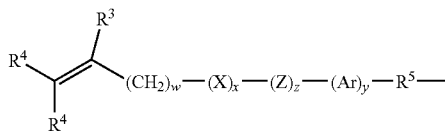

wherein: $R^3$ is hydrogen or methyl;
$R^4$ is hydrogen, an alkyl radical having 1 to 6 carbon atoms, or a —CO—Y—$R^6$ radical wherein Y is —O—, —S— or —NH—;
$R^5$ is a divalent alkylene radical having 1 to about 10 carbon atoms;
$R^6$ is a alkyl radical having 1 to about 12 carbon atoms;
X denotes —CO— or —OCO—;
Z denotes —O— or —NH—;
Ar denotes an aromatic radical having about 6 to about 30 carbon atoms;
w is 0 to 6; x is 0 or 1; y is 0 or 1; and z is 0 or 1.

A preferred silicone-containing urethane monomer is represented by Formula VI:

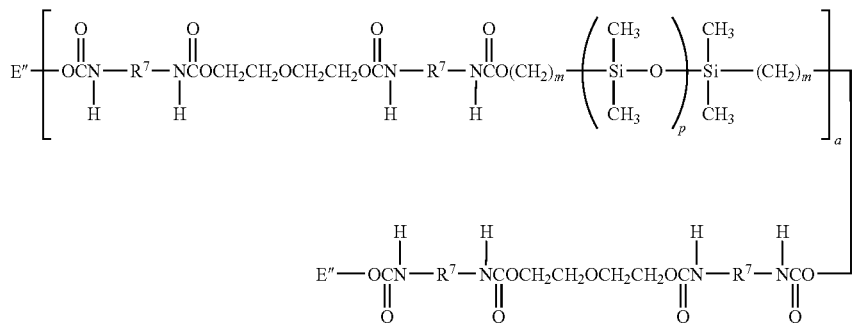

wherein m is at least 1 and is preferably 3 or 4, a is at least 1 and preferably is 1, p is a number which provides a moiety weight of about 400 to about 10,000 and is preferably at least about 30, $R^7$ is a diradical of a diisocyanate after removal of the isocyanate group, such as the diradical of isophorone diisocyanate, and each E" is a group represented by:

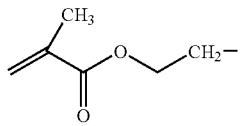

In another embodiment of the present invention, a silicone hydrogel material comprises (in bulk, that is, in the monomer mixture that is copolymerized) about 5 to about 50 percent, and preferably about 10 to about 25, by weight of one or more silicone macromonomers, about 5 to about 75 percent, and preferably about 30 to about 60 percent, by weight of one or more polysiloxanylalkyl(meth)acrylic monomers, and about 10 to about 50 percent, and preferably about 20 to about 40 percent, by weight of a hydrophilic monomer. In general, the silicone macromonomer is a poly(organosiloxane) capped with an unsaturated group at two or more ends of the molecule. In addition to the end groups in the above structural formulas, U.S. Pat. No. 4,153,641 discloses additional unsaturated groups, including acryloxy or methacryloxy. Fumarate-containing materials such as those disclosed in U.S. Pat. Nos. 5,310,779; 5,449,729 and 5,512,205 are also useful substrates in accordance with the invention. Preferably, the silane macromonomer is a silicon-containing vinyl carbonate or vinyl carbamate or a polyurethane-polysiloxane having one or more hard-soft-hard blocks and end-capped with a hydrophilic monomer.

The above silicone materials are merely exemplary, and other materials for use as substrates that can benefit by being packaged in the packaging solution according to the present invention and have been disclosed in various publications and are being continuously developed for use in contact lenses and other medical devices can also be used. For example, an ophthalmic lens for use herein can be a cationic lens such as a cationic contact lens or fluorinated silicone-containing monomers. Such monomers have been used in the formation of fluorosilicone as disclosed in, for example, U.S. Pat. Nos. 4,954,587; 5,010,141 and 5,079,319. The use of silicone-containing monomers having certain fluorinated side groups, i.e., —($CF_2$)—H, have been found to improve compatibility between the hydrophilic and silicone-containing monomeric units. See, e.g., U.S. Pat. Nos. 5,321,108 and 5,387,662.

Ophthalmic devices such as contact lenses for application of the present invention can be manufactured employing various conventional techniques, to yield a shaped article having the desired posterior and anterior lens surfaces. In one embodiment, an ophthalmic device can be prepared by polymerizing the monomeric mixtures to form a product that can be subsequently formed into the appropriate shape by, for example, lathing, injection molding, compression molding, cutting and the like. For example, in producing contact lenses, the initial monomeric mixture may be polymerized in tubes to provide rod-shaped articles, which are then cut into buttons. The buttons may then be lathed into contact lenses.

Alternately, the ophthalmic devices may be cast directly in molds, e.g., polypropylene molds, from the monomeric mixtures, e.g., by spincasting and static casting methods. Spincasting methods are disclosed in U.S. Pat. Nos. 3,408,429 and 3,660,545, and static casting methods are disclosed in U.S. Pat. Nos. 4,113,224, 4,197,266, and 5,271,875. Spincasting methods involve charging the monomer mixture to a mold, and spinning the mold in a controlled manner while exposing the monomer mixture to a radiation source such as UV light. Static casting methods involve charging the monomeric mixture between two mold sections, one mold section shaped to form the anterior lens surface and the other mold section shaped to form the posterior lens surface, and curing the monomeric mixture while retained in the mold assembly to form a lens, for example, by free radical polymerization of the monomeric mixture. Examples of free radical reaction techniques to cure the lens material include thermal radiation, infrared radiation, electron beam radiation, gamma radiation, ultraviolet (UV) radiation, and the like; or combinations of such techniques may be used. U.S. Pat. No. 5,271,875 describes a static cast molding method that permits molding of a finished lens in a mold cavity defined by a posterior mold and an anterior mold. As an additional method, U.S. Pat. No. 4,555,732 discloses a process where an excess of a monomeric mixture is cured by spincasting in a mold to form a shaped article having an anterior lens surface and a relatively large thickness, and the posterior surface of the cured spincast article is subsequently lathed to provide a contact lens having the desired thickness and posterior lens surface.

Polymerization may be facilitated by exposing the mixture to heat and/or radiation, such as ultraviolet light, visible light, or high energy radiation. A polymerization initiator may be included in the mixture to facilitate the polymerization step. Representative examples of free radical thermal polymerization initiators include organic peroxides such as acetal peroxide, lauroyl peroxide, decanoyl peroxide, stearoyl peroxide, benzoyl peroxide, tertiarylbutyl peroxypivalate, peroxydicarbonate, and the like. Representative UV initiators are those known in the art and include benzoin methyl ether, benzoin ethyl ether, Darocure 1173, 1164, 2273, 1116, 2959, 3331 (EM Industries) and Igracure 651 and 184 (Ciba-Geigy), and the like. Generally, the initiator will be employed in the monomeric mixture at a concentration of about 0.01 to 1 percent by weight of the total mixture.

After producing a lens having the desired final shape, it is desirable to remove residual solvent from the lens before edge-finishing operations. This is because, typically, an organic diluent is included in the initial monomeric mixture in order to minimize phase separation of polymerized products produced by polymerization of the monomeric mixture and to lower the glass transition temperature of the reacting polymeric mixture, which allows for a more efficient curing process and ultimately results in a more uniformly polymerized product. Sufficient uniformity of the initial monomeric mixture and the polymerized product are of particular concern for silicone hydrogels, primarily due to the inclusion of silicone-containing monomers which may tend to separate from the hydrophilic comonomer. Suitable organic diluents include, for example, monohydric alcohols such as $C_6$-$C_{10}$ straight-chained aliphatic monohydric alcohols, e.g., n-hexanol and n-nonanol; diols such as ethylene glycol; polyols such as glycerin; ethers such as diethylene glycol monoethyl ether; ketones such as methyl ethyl ketone; esters such as methyl enanthate; and hydrocarbons such as toluene. Preferably, the organic diluent is sufficiently volatile to facilitate its removal from a cured article by evaporation at or near ambient pressure. Generally, the diluent is included at about 5 to about 60 percent by weight of the monomeric mixture, with about 10 to about 50 percent by weight being especially preferred.

The cured lens can then be subjected to solvent removal, which can be accomplished by evaporation at or near ambient pressure or under vacuum. An elevated temperature can be employed to shorten the time necessary to evaporate the diluent. The time, temperature and pressure conditions for the solvent removal step will vary depending on such factors as the volatility of the diluent and the specific monomeric components, as can be readily determined by one skilled in the art. According to a preferred embodiment, the temperature employed in the removal step is preferably at least about 50° C., for example, about 60° C. to about 80° C. A series of heating cycles in a linear oven under inert gas or vacuum may be used to optimize the efficiency of the solvent removal. The cured article after the diluent removal step should contain no more than twenty percent by weight of diluent, preferably no more than about 5 percent by weight or less.

Following removal of the organic diluent, the lens can then be subjected to mold release and optional machining operations. The machining step includes, for example, buffing or polishing a lens edge and/or surface. Generally, such machining processes may be performed before or after the article is released from a mold part. Preferably, the lens is dry released from the mold by employing vacuum tweezers to lift the lens from the mold, after which the lens is transferred by means of mechanical tweezers to a second set of vacuum tweezers and placed against a rotating surface to smooth the surface or edges. The lens may then be turned over in order to machine the other side of the lens.

As one skilled in the art will readily appreciate, ophthalmic device surface functional groups of the ophthalmic device according to the present invention may be inherently present at the surface of the device. However, if the ophthalmic device contains too few or no functional groups, the surface of the device can be modified by known techniques, for example, plasma chemical methods (see, for example, WO 94/06485), or conventional functionalization with groups such as —OH, or —$CO_2$H. Suitable ophthalmic device surface functional groups of the ophthalmic device include a wide variety of groups well known to the skilled artisan. Representative examples of such functional groups include, but are not limited to, hydroxy groups, cis 1,2-diols, cis 1,3-diols, α hydroxy acid groups (e.g., sialic acid, salicylic acid), carboxylic acids, di-carboxylic acids, catechols, silanols, silicates and the like.

In a preferred embodiment, the foregoing ophthalmic devices are subjected to an oxidative surface treatment such as corona discharge or plasma oxidation followed by treatment with the brush copolymers of the present invention. For example, an ophthalmic device such as a silicone hydrogel formulation containing hydrophilic polymers, such as poly (N,N-dimethylacrylamide) or poly(N-vinylpyrrolidinone), is subjected to an oxidative surface treatment to form at least silicates on the surface of the lens and then the lens is treated with an aqueous packaging solution containing the brush copolymer according to the present invention to render a lubricious, stable, highly wettable brush copolymer based surface coating. The complexation treatment is advantageously performed under autoclave conditions (sterilization conditions).

The standard process such as a plasma process (also referred to as "electrical glow discharge processes") provides a thin, durable surface upon the ophthalmic device prior to binding the brush copolymer to at least a portion of the surface thereof. Examples of such plasma processes are provided in U.S. Pat. Nos. 4,143,949; 4,312,575; and 5,464,667.

Although plasma processes are generally well known in the art, a brief overview is provided below. Plasma surface treatments involve passing an electrical discharge through a gas at low pressure. The electrical discharge may be at radio frequency (typically 13.56 MHz), although microwave and other frequencies can be used. Electrical discharges produce ultraviolet (UV) radiation, in addition to being absorbed by atoms and molecules in their gas state, resulting in energetic electrons and ions, atoms (ground and excited states), molecules, and radicals. Thus, a plasma is a complex mixture of atoms and molecules in both ground and excited states, which reach a steady state after the discharge is begun. The circulating electrical field causes these excited atoms and molecules to collide with one another as well as the walls of the chamber and the surface of the material being treated.

The deposition of a coating from a plasma onto the surface of a material has been shown to be possible from high-energy plasmas without the assistance of sputtering (sputter-assisted deposition). Monomers can be deposited from the gas phase and polymerized in a low pressure atmosphere (about 0.005 to about 5 torr, and preferably about 0.001 to about 1 torr) onto a substrate utilizing continuous or pulsed plasmas, suitably as high as about 1000 watts. A modulated plasma, for example, may be applied about 100 milliseconds on then off. In addition, liquid nitrogen cooling has been utilized to condense vapors out of the gas phase onto a substrate and subsequently use the plasma to chemically react these materials with the substrate. However, plasmas do not require the use of external cooling or heating to cause the deposition. Low or high wattage (e.g., about 5 to about 1000, and preferably about 20 to about 500 watts) plasmas can coat even the most chemical-resistant substrates, including silicones.

After initiation by a low energy discharge, collisions between energetic free electrons present in the plasma cause the formation of ions, excited molecules, and free-radicals. Such species, once formed, can react with themselves in the gas phase as well as with further ground-state molecules. The plasma treatment may be understood as an energy dependent process involving energetic gas molecules. For chemical reactions to take place at the surface of the lens, one needs the required species (element or molecule) in terms of charge state and particle energy. Radio frequency plasmas generally produce a distribution of energetic species. Typically, the "particle energy" refers to the average of the so-called Boltzman-style distribution of energy for the energetic species. In a low-density plasma, the electron energy distribution can be related by the ratio of the electric field strength sustaining the plasma to the discharge pressure (E/p). The plasma power density P is a function of the wattage, pressure, flow rates of gases, etc., as will be appreciated by the skilled artisan. Background information on plasma technology, hereby incorporated by reference, includes the following: A. T. Bell, Proc. Intl. Conf. Phenom. Ioniz. Gases, *"Chemical Reaction in Nonequilibrium Plasmas"*, 19-33 (1977); J. M. Tibbitt, R. Jensen, A. T. Bell, M. Shen, Macromolecules, "A Model for the Kinetics of Plasma Polymerization", 3, 648-653 (1977); J. M. Tibbitt, M. Shen, A. T. Bell, J. Macromol. Sci.-Chem., *"Structural Characterization of Plasma-Polymerized Hydrocarbons"*, A10, 1623-1648 (1976); C. P. Ho, H. Yasuda, J. Biomed, Mater. Res., *"Ultrathin coating of plasma polymer of methane applied on the surface of silicone contact lenses"*, 22, 919-937 (1988); H. Kobayashi, A. T. Bell, M. Shen, Macromolecules, *"Plasma Polymerization of Saturated and Unsaturated Hydrocarbons"*, 3, 277-283 (1974); R. Y. Chen, U.S. Pat. No. 4,143,949, Mar. 13, 1979, *"Process for Putting a Hydrophilic Coating on a Hydrophobic Contact lens"*; and H. Yasuda, H. C. Marsh, M. O. Bumgarner, N. Morosoff, J. of Appl. Poly. Sci., *"Polymerization of Organic Compounds in an Electroless Glow Discharge. VI. Acetylene with Unusual Co-monomers"*, 19, 2845-2858 (1975).

Based on this previous work in the field of plasma technology, the effects of changing pressure and discharge power on the rate of plasma modification can be understood. The rate generally decreases as the pressure is increased. Thus, as pressure increases the value of E/p, the ratio of the electric field strength sustaining the plasma to the gas pressure decreases and causes a decrease in the average electron energy. The decrease in electron energy in turn causes a reduction in the rate coefficient of all electron-molecule collision processes. A further consequence of an increase in pressure is a decrease in electron density. Providing that the pressure is held constant, there should be a linear relationship between electron density and power.

In practice, contact lenses are surface-treated by placing them, in their unhydrated state, within an electric glow discharge reaction vessel (e.g., a vacuum chamber). Such reaction vessels are commercially available. The lenses may be supported within the vessel on an aluminum tray (which acts as an electrode) or with other support devices designed to adjust the position of the lenses. The use of a specialized support devices which permit the surface treatment of both sides of a lens are known in the art and may be used herein.

As mentioned above, the surface of the lens, for example, a silicone hydrogel continuous-wear lens is initially treated, e.g., oxidized, by the use of a plasma to render the subsequent brush copolymer surface deposition more adherent to the lens. Such a plasma treatment of the lens may be accomplished in an atmosphere composed of a suitable media, e.g., an oxidizing media such as oxygen, air, water, peroxide, $O_2$ (oxygen gas), etc., or appropriate combinations thereof, typically at an electric discharge frequency of about 13.56 Mhz, preferably between about 20 to about 500 watts at a pressure of about 0.1 to about 1.0 torr, preferably for about 10 seconds to about 10 minutes or more, more preferably about 1 to about 10 minutes. It is preferred that a relatively "strong" plasma is utilized in this step, for example, ambient air drawn through a five percent (5%) hydrogen peroxide solution. Those skilled in the art will know other methods of improving or promoting adhesion for bonding of the subsequent brush copolymer layer.

Next, the ophthalmic device such as a lens will be immersed in an aqueous packaging solution and stored in a packaging system according to the present invention. Generally, a packaging system for the storage of an ophthalmic device according to the present invention includes at least a sealed container containing one or more unused ophthalmic devices immersed in an aqueous packaging solution. Preferably, the sealed container is a hermetically sealed blister-pack, in which a concave well containing an ophthalmic device such as a contact lens is covered by a metal or plastic sheet adapted for peeling in order to open the blister-pack. The sealed container may be any suitable generally inert packaging material providing a reasonable degree of protection to the lens, preferably a plastic material such as polyalkylene, PVC, polyamide, and the like.

The aqueous packaging solution will contain one or more brush polymers containing at least (a) monomeric units derived from an ethylenically unsaturated monomer containing one or more boronic acid moieties; and (b) monomeric units derived from an ethylenically unsaturated-containing hydrophilic macromonomer.

Representative examples of suitable ethylenically unsaturated monomers containing one or more boronic acid moieties include ethylenically unsaturated-containing alkyl boronic acids; ethylenically unsaturated-containing cycloalkyl boronic acids; ethylenically unsaturated-containing aryl boronic acids and the like and mixtures thereof. Preferred ethylenically unsaturated monomers having one or more boronic acid moieties include 4-vinylphenylboronic acid, 3-methacrylamidophenylboronic acid, 3-acrylamidophenylboronic acid and mixtures thereof.

Representative examples of alkyl groups for use herein include, by way of example, a straight or branched hydrocarbon chain radical containing carbon and hydrogen atoms of from 1 to about 18 carbon atoms with or without unsaturation, to the rest of the molecule, e.g., methyl, ethyl, n-propyl, 1-methylethyl (isopropyl), n-butyl, n-pentyl, etc., and the like.

Representative examples of cycloalkyl groups for use herein include, by way of example, a substituted or unsubstituted non-aromatic mono or multicyclic ring system of about 3 to about 24 carbon atoms such as, for example, cyclopropyl, cyclobutyl, cyclopentyl, cyclohexyl, perhydronapththyl, adamantyl and norbornyl groups bridged cyclic group or sprirobicyclic groups, e.g., sprio-(4,4)-non-2-yl and the like, optionally containing one or more heteroatoms, e.g., O and N, and the like.

Representative examples of aryl groups for use herein include, by way of example, a substituted or unsubstituted monoaromatic or polyaromatic radical containing from about 5 to about 30 carbon atoms such as, for example, phenyl, naphthyl, tetrahydronapthyl, indenyl, biphenyl and the like, optionally containing one or more heteroatoms, e.g., O and N, and the like.

Representative examples of the ethylenically unsaturated moiety of the ethylenically unsaturated monomer include, by way of example, (meth)acrylate-containing radicals, (meth)acrylamido-containing radicals, vinylcarbonate-containing radicals, vinylcarbamate-containing radicals, styrene-containing radicals, itaconate-containing radicals, vinyl-containing radicals, vinyloxy-containing radicals, fumarate-containing radicals, maleimide-containing radicals, vinylsulfonyl radicals and the like. As used herein, the term "(meth)" denotes an optional methyl substituent. Thus, for example, terms such as "(meth)acrylate" denotes either methacrylate or acrylate, and "(meth)acrylamide" denotes either methacrylamide or acrylamide.

In one embodiment, an ethylenically unsaturated moiety of the ethylenically unsaturated boronic acid-containing monomer is represented by the general formula:

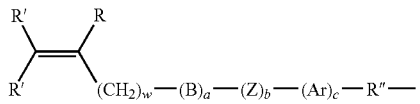

wherein R is hydrogen or a alkyl group having 1 to 6 carbon atoms such as methyl; each R' is independently hydrogen, an alkyl radical having 1 to 6 carbon atoms, or a —CO—Y—R''' radical wherein Y is —O—, —S— or —NH— and R''' is an alkyl radical having 1 to about 10 carbon atoms; R'' is a linking group (e.g., a divalent alkenyl radical having 1 to about 12 carbon atoms); B denotes —O— or —NH—; Z denotes —CO—, —OCO— or —COO—; Ar denotes an aromatic radical having 6 to about 30 carbon atoms; w is 0 to 6; a is 0 or 1; b is 0 or 1; and c is 0 or 1. The ethylenically unsaturated-containing moiety can be attached to the boronic acid-containing monomers as pendent groups, terminal groups or both.

The brush copolymers further include monomeric units derived from an ethylenically unsaturated-containing hydrophilic macromonomer. As used herein, the term "macromonomer" denotes high molecular weight polymers that are prepared by free radical polymerization or controlled radical polymerization. In general, the hydrophilic macromonomers have a number average molecular weight of about 500 to about 200,000 and preferably from about 500 to about 20,000. The hydrophilic groups are derived from a hydrophilic monomer such as, for example, acrylamides such as N,N-dimethylacrylamide, N,N-dimethylmethacrylamide, and the like; acetamides such as N-vinyl-N-methyl acetamide, N-vinyl acetamide and the like; formamides such as N-vinyl-N-methyl formamide, N-vinyl formamide, and the like; cyclic lactams such as N-vinyl-2-pyrrolidone and the like; (meth)acrylated alcohols such as 2-hydroxyethyl methacrylate, 2-hydroxyethyl acrylate and the like; (meth)acrylated poly(ethyleneglycol)s and the like and mixtures thereof. The ethylenically unsaturated-containing moiety can be any of the ethylenically unsaturated-containing moieties discussed hereinabove. As one skilled in the art will readily appreciate, the ethylenically unsaturated-containing moiety can be attached to the hydrophilic monomer as a pendent group, terminal group or both.

In one embodiment, the hydrophilic macromonomers can be expeditiously prepared using techniques of controlled radical polymerization, i.e. by atom-transfer radical polymerization (ATRP) or reversible addition-fragmentation chain transfer (RAFT) polymerization. RAFT polymerization employs a chain transfer agent that allows construction of hydrophilic macromonomers with a well-defined molecular weight distribution and narrow polydispersity. RAFT polymerization is particularly preferred because it is compatible with a wide variety of vinyl monomers. For example, hydroxy-functionalized xanthate RAFT agents such as 2-hydroxyethyl 2-(ethoxyxanthyl)propionate (HEEXP) can be used with monomers such as NVP (Scheme A) and carboxylate-functional trithiocarbonate RAFT agents such as 2-methyl 2-(dodecylthiocarbonylthio)propanoic acid (MDTCTPA) work well with more reactive monomers such as DMA (Scheme B). Other RAFT agent types such as dithiocarbamates and aliphatic or aromatic dithioesters may also be used depending on the type of vinyl monomer employed. RAFT agents having appropriate end group functionalities such as those illustrated in Schemes A, B and C, can be used to prepare the hydrophilic macromonomers for use in forming the brush copolymers of the present invention.

SCHEME A

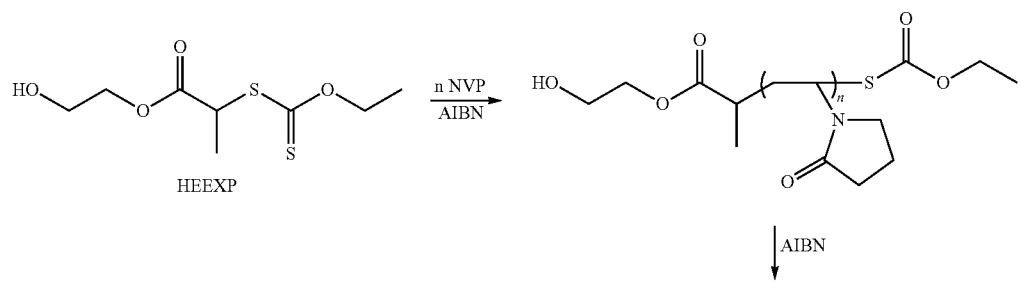

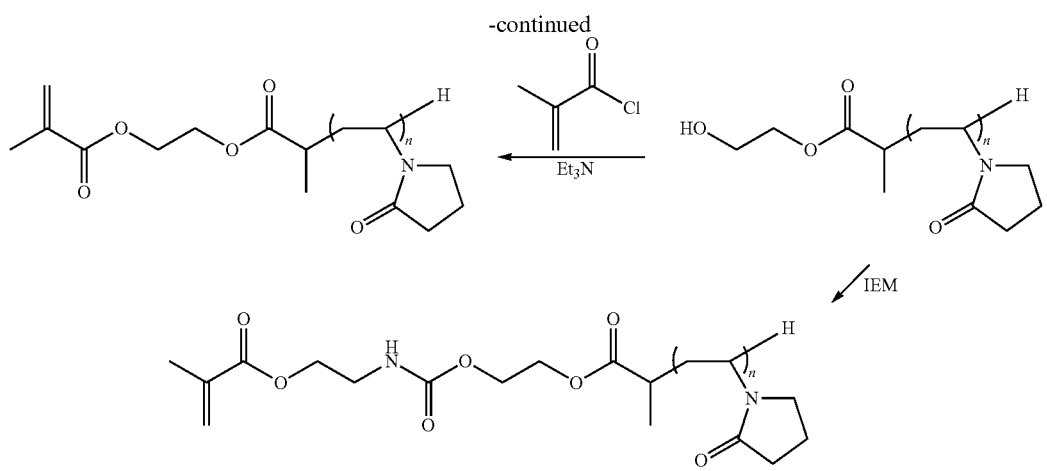
wherein n is from 5 to about 200 and preferably from 5 to about 20.
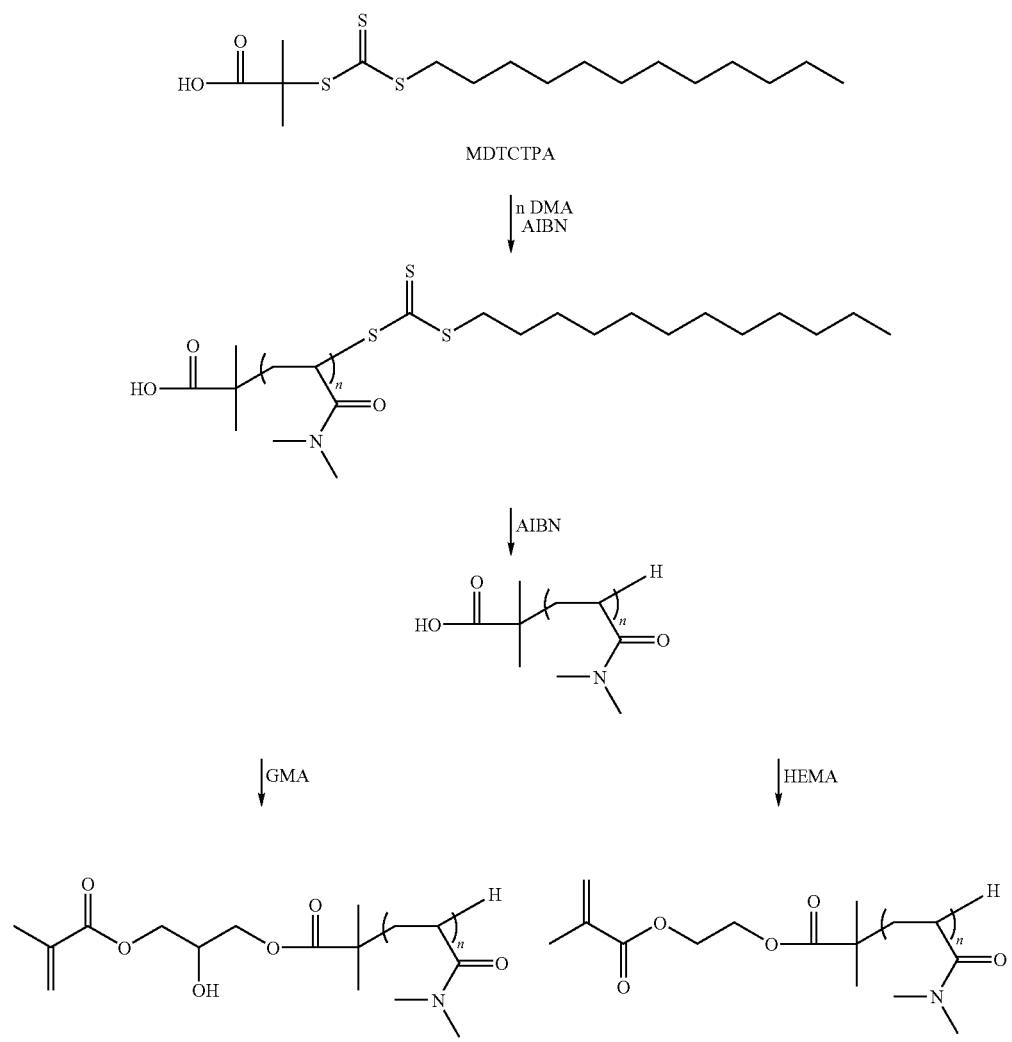
wherein n has the aforestated meanings.

SCHEME C

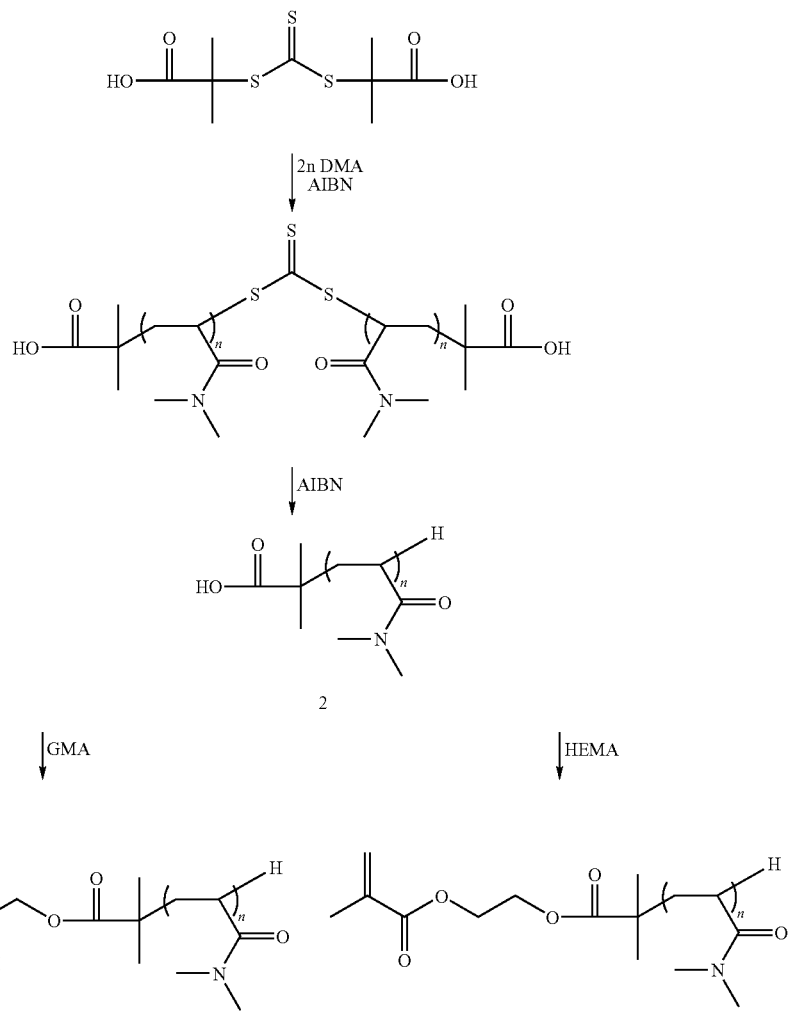

wherein n has the aforestated meanings.

In another embodiment, the ethylenically unsaturated hydrophilic macromonomers can be obtained by first (1) mixing the hydrophilic monomer with a suitable chain transfer agent; (2) adding a polymerization initiator; (3) and subjecting the monomer/initiator mixture to a source of heat. Suitable chain transfer agents include, but are not limited to, thioglycolic acid, mercaptoethanol; and the like. Typical initiators include free-radical-generating polymerization initiators of the type illustrated by acetyl peroxide, lauroyl peroxide, decanoyl peroxide, coprylyl peroxide, benzoyl peroxide, tertiary butyl peroxypivalate, sodium percarbonate, tertiary butyl peroctoate, and azobis-isobutyronitrile (AIBN). The level of initiator employed will vary within the range of 0.01 to 2 weight percent of the mixture of monomers. Usually, a mixture of the above-mentioned monomers is warmed with addition of a free-radical former.

The reaction can be carried out at a temperature of between about 50° C. to about 70° C. for about 12 to about 72 hours. The reaction can be carried out in the presence of a suitable solvent. Suitable solvents are in principle all solvents which dissolve the monomer used, for example, carboxamides such as dimethylformamide; polar aprotic solvents such as dimethyl sulfoxide; ketones such as acetone or cyclohexanone; ethers such as ethyl ether, tetrahydrofuran, dioxane; and hydrocarbons such as toluene and the like.

Next, the ethylenically unsaturated-containing moiety is introduced by using an excess of either acryloyl or methacryloyl chloride and in the presence of an amine scavenger such as triethylamine. The reaction can be carried out at room temperature. In one embodiment, the ethylenically unsaturated hydrophilic macromonomers can be prepared according to the method generally shown in Schemes D and E below.

SCHEME D

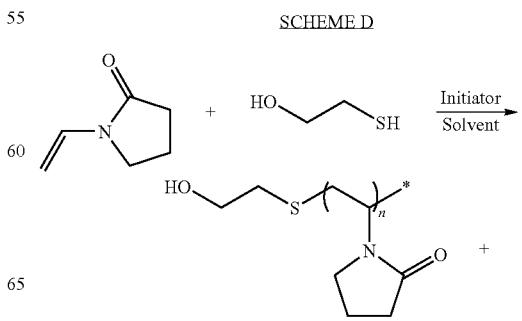

-continued

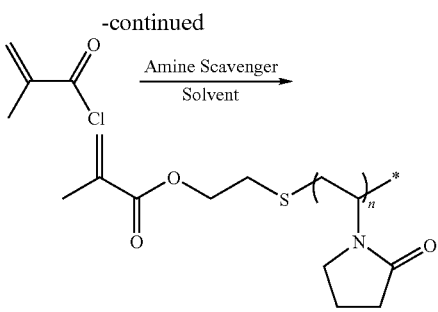

wherein n has the aforestated meanings.

SCHEME E

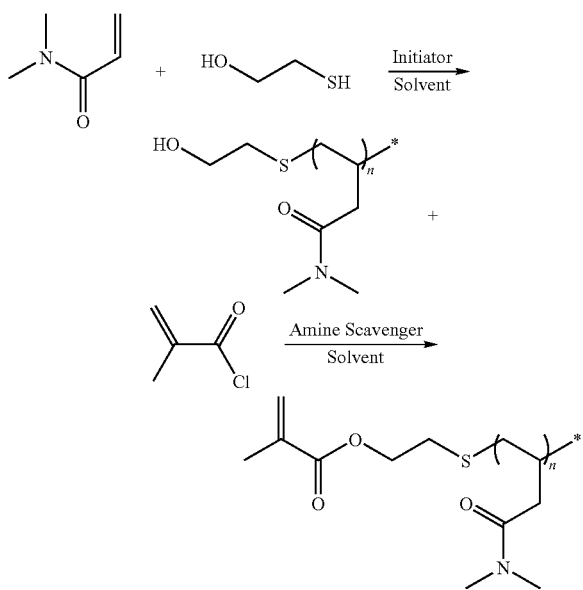

wherein n has the aforestated meanings.

The brush copolymers can further include a monomeric unit containing a tertiary-amine terminal moiety in the backbone of the polymer. Suitable monomers copolymerizable with the boronic acid monomer and hydrophilic macromonomer are ethylenically unsaturated monomers containing a tertiary-amine moiety. Representative examples include, but are not limited to, 2-(N,N-dimethyl)ethylamino(meth)acrylate, N-[2-(dimethylamino)ethyl](meth)acrylamide, N-[(3-dimethylamino)propyl](meth)acrylate, N-[3-dimethylamino)propyl](meth)acrylamide, vinylbenzyl-N,N-dimethylamine and the like and mixtures thereof.

The brush copolymers according to the present invention may further include a monomeric unit containing a hydrophilic moiety in the backbone of the polymer. Representative examples include, but are not limited to, N,N-dimethylacrylamide, N,N-dimethylmethacrylamide and the like; acetamides such as N-vinyl-N-methyl acetamide and N-vinyl acetamide and the like; formamides such as N-vinyl-N-methyl formamide and N-vinyl formamide, and the like; 2cyclic lactams such as N-vinyl-2-pyrrolidone and the like; (meth) acrylated alcohols such as 2-hydroxyethyl methacrylate, 2-hydroxyethyl acrylate and the like; (meth)acrylated poly (ethyleneglycol)s and the like and mixtures thereof. The hydrophilic monomeric unit in the polymer, when used, ensures that the copolymer is water-soluble, thus avoiding the need to dissolve the copolymer in organic solvent when applying the polymer to the lens surface.

One class of brush copolymers are copolymers containing (a) monomeric units derived from an ethylenically unsaturated monomer containing one or more boronic acid moieties, (b) monomeric units derived from an ethylenically unsaturated hydrophilic macromonomer, (c) monomeric units derived from the ethylenically unsaturated monomer containing a tertiary-amine moiety, and (d) monomeric units derived from an ethylenically unsaturated hydrophilic monomer in an amount sufficient to render the copolymer water soluble. This class of copolymers may contain about 1 to about 20 mole percent of the boronic acid-containing monomeric units, and preferably about 2 to about 10 mole percent; about 1 to about 20 mole percent of monomeric units derived from an ethylenically unsaturated hydrophilic macromonomer, and preferably about 2 to about 10 mole percent, 1 to about 20 mole percent of the tertiary-amine-containing monomeric units, and preferably about 2 to about 10 mole percent; and 40 to about 90 mole percent of the hydrophilic monomeric units, and preferably about 50 to about 80 mole percent.

The brush copolymers according to the present invention can be obtained by a polymerization reaction customary to the person skilled in the art. Typically, the polymers or chains are formed by subjecting a monomers/photo initiator mixture to a source of ultraviolet or actinic radiation and/or elevated temperature and curing the mixture. Typical polymerization initiators include free-radical-generating polymerization initiators such as acetyl peroxide, lauroyl peroxide, decanoyl peroxide, caprylyl peroxide, benzoyl peroxide, tertiary butyl peroxypivalate, sodium percarbonate, tertiary butyl peroctoate, and azobis-isobutyronitrile (AIBN). Typical ultraviolet free-radical initiators such as diethoxyacetophenone can also be used. The curing process will of course depend upon the initiator used and the physical characteristics of the monomer or monomer mixture such as viscosity. In any event, the level of initiator employed will vary within the range of about 0.001 to about 2 weight percent of the mixture of monomers.

Polymerization to form the resulting brush polymers can be carried out in the presence or absence of a solvent. Suitable solvents are in principle a solvent is capable of dissolving all of the monomers present in the monomer mixture. In a preferred embodiment, a suitable solvent is a polar solvent such as, for example, water; alcohols such as lower alkanols, for example, methanol and ethanol; and the like.

The amount of the brush copolymer employed in a packaging solution for storing an ophthalmic device in a packaging system of the present invention is an amount effective to improve the surface properties of the ophthalmic device. Generally, the concentration of a brush copolymer present in the packaging solution of the invention will range from about 0.01 to about 10% w/w.

The packaging solutions according to the present invention are physiologically compatible. Specifically, the solution must be "ophthalmically safe" for use with a lens such as a contact lens, meaning that a contact lens treated with the solution is generally suitable and safe for direct placement on the eye without rinsing, that is, the solution is safe and comfortable for daily contact with the eye via a contact lens that has been wetted with the solution. An ophthalmically safe solution has a tonicity and pH that is compatible with the eye and includes materials, and amounts thereof, that are non-cytotoxic according to ISO standards and U.S. Food & Drug Administration (FDA) regulations.

The packaging solution should also be sterile in that the absence of microbial contaminants in the product prior to release must be statistically demonstrated to the degree necessary for such products. The liquid media useful in the present invention are selected to have no substantial detrimental effect on the lens being treated or cared for and to allow or even facilitate the present lens treatment or treatments. The liquid media are preferably aqueous-based. A particularly useful aqueous liquid medium is that derived from saline, for example, a conventional saline solution or a conventional buffered saline solution.

The pH of the present solutions should be maintained within the range of about 6 to about 9, and preferably about 6.5 to about 7.8. Suitable buffers may be added, such as boric acid, sodium borate, potassium citrate, citric acid, sodium bicarbonate, TRIS and various mixed phosphate buffers (including combinations of $Na_2HPO_4$, $NaH_2PO_4$ and $KH_2PO4$) and mixtures thereof. Generally, buffers will be used in amounts ranging from about 0.05 to about 2.5 percent by weight, and preferably from about 0.1 to about 1.5 percent by weight of the solution. The packaging solutions of this invention preferably contain a borate buffer, containing one or more of boric acid, sodium borate, potassium tetraborate, potassium metaborate or mixtures of the same.

Typically, the solutions of the present invention are also adjusted with tonicity agents, to approximate the osmotic pressure of normal lacrimal fluids which is equivalent to a 0.9 percent solution of sodium chloride or 2.5 percent of glycerol solution. The solutions are made substantially isotonic with physiological saline used alone or in combination, otherwise if simply blended with sterile water and made hypotonic or made hypertonic the lenses will lose their desirable optical parameters. Correspondingly, excess saline may result in the formation of a hypertonic solution which will cause stinging and eye irritation.

Examples of suitable tonicity adjusting agents include, but are not limited to, sodium and potassium chloride, dextrose, glycerin, calcium and magnesium chloride and the like and mixtures thereof. These agents are typically used individually in amounts ranging from about 0.01 to about 2.5% w/v and preferably from about 0.2 to about 1.5% w/v. Preferably, the tonicity agent will be employed in an amount to provide a final osmotic value of at least about 200 mOsm/kg, preferably from about 200 to about 400 mOsm/kg, more preferably from about 250 to about 350 mOsm/kg, and most preferably from about 280 to about 320 mOsm/kg.

If desired, one or more additional components can be included in the packaging solution. Such additional component or components are chosen to impart or provide at least one beneficial or desired property to the packaging solution. Such additional components may be selected from components which are conventionally used in one or more ophthalmic device care compositions. Examples of such additional components include cleaning agents, wetting agents, nutrient agents, sequestering agents, viscosity builders, contact lens conditioning agents, antioxidants, and the like and mixtures thereof. These additional components may each be included in the packaging solutions in an amount effective to impart or provide the beneficial or desired property to the packaging solutions. For example, such additional components may be included in the packaging solutions in amounts similar to the amounts of such components used in other, e.g., conventional, contact lens care products.

Useful sequestering agents include, but are not limited to, disodium ethylene diamine tetraacetate, alkali metal hexametaphosphate, citric acid, sodium citrate and the like and mixtures thereof.

Useful viscosity builders include, but are not limited to, hydroxyethyl cellulose, hydroxymethyl cellulose, polyvinyl pyrrolidone, polyvinyl alcohol and the like and mixtures thereof.

Useful antioxidants include, but are not limited to, sodium metabisulfite, sodium thiosulfate, N-acetylcysteine, butylated hydroxyanisole, butylated hydroxytoluene and the like and mixtures thereof.

The method of packaging and storing an ophthalmic device such as a contact lens according to the present invention includes at least packaging an ophthalmic device immersed in the aqueous packaging solution described above. The method may include immersing the ophthalmic device in an aqueous packaging solution prior to delivery to the customer/wearer, directly following manufacture of the contact lens. Alternately, the packaging and storing in the solution of the present invention may occur at an intermediate point before delivery to the ultimate customer (wearer) but following manufacture and transportation of the lens in a dry state, wherein the dry lens is hydrated by immersing the lens in the packaging solution. Consequently, a package for delivery to a customer may include a sealed container containing one or more unused contact lenses immersed in an aqueous packaging solution according to the present invention.

In one embodiment, the steps leading to the present ophthalmic device packaging system includes (1) molding an ophthalmic device in a mold comprising at least a first and second mold portion, (2) hydrating and cleaning the device in a container comprising at least one of the mold portions, (3) introducing the packaging solution with the copolymer into the container with the device supported therein, and (4) sealing the container. Preferably, the method also includes the step of sterilizing the contents of the container. Sterilization may take place prior to, or most conveniently after, sealing of the container and may be effected by any suitable method known in the art, e.g., by autoclaving of the sealed container at temperatures of about 120° C. or higher.

The following examples are provided to enable one skilled in the art to practice the invention and are merely illustrative of the invention. The examples should not be read as limiting the scope of the invention as defined in the claims.

In the examples, the following abbreviations are used.
PVP: poly(vinyl pyrrolidone)
DMA: N,N-dimethylacrylamide
DMAPMA: N-[3-(dimethylamino)propyl]methacrylamide
NVP: N-vinyl-2-pyrrolidone
Vazo™ 64: azo bis-isobutylnitrile (AIBN)
THF: tetrahydrofuran

EXAMPLE 1

Preparation of Methacrylated PVP Macromer

To a 1-L 3-neck round bottom flask containing a magnetic stir bar, water-cooled condenser and thermocouple was added 0.177 g AIBN (0.30-wt % based on total weight of NVP), 4.22 g (10-mol % based on NVP, Aldrich No. M2650) of 2-mercaptoethanol and 60 g of distilled NVP (Aldrich Cat. No. V3409). The mixture was dissolved by the addition of 250 mL of anhydrous THF to the flask. Next, the solution was sparged with argon for at least 10 minutes before gradual heating to 60° C. The sparging was discontinued when the solution reached 40 to 45° C. and the flask was subsequently maintained under argon backpressure. After 72 hours the heating was discontinued at which point the room temperature (RT) solution was opened to the atmosphere through a drying tube containing Drierite. Triethylamine (8.65 mL, 1.15 equivalents based on mercaptoethanol, Aldrich Cat. No. 471283) was added to the flask, whereupon some of the dissolved polymer precipitated. The solution was stirred at RT until all of the polymer redissolved. Methacryloyl chloride (5.75 mL, 1.10 equiv., Aldrich Cat. No. 523216) was then added in one portion, and the solution was allowed to stir at RT overnight. Triethylamine hydrochloride was removed from the solution by vacuum filtration. The filtered solution was added dropwise to 6-L of mechanically stirred ethyl ether. The solid was collected by vacuum filtration and the product dried in vacuo at RT for a minimum of 18 hours to provide 54 g of white prills. The number average molecular weight of methacrylated PVP was estimated to be 1200 Daltons.

EXAMPLE 2

Preparation of PVP Brush Polymer

To a 1-L 3-neck round bottom flask containing a magnetic stir bar, water-cooled condenser and thermocouple was added 0.152 g AIBN (0.40-wt % based on total weight of monomers), 1.21 g (4.25-mol %, Combi-Blocks No. BB-3222) of 3-methacrylamidophenylboronic acid, 25.0 g of the methacrylated PVP macromer of Example 1 (15 mol %), 2.01 g (8.5 mol %, Aldrich Cat. No. 409-472-1L) of deinhibited and distilled DMAPMA and 9.95 g (72.25-mol %, Aldrich Cat. No. 274135-500ML) of distilled DMA. The mixture was dissolved by addition of 200-mL of methanol to the flask. The solution was sparged with argon for at least 10 minutes before gradual heating to 60° C. The sparging was discontinued when the solution reached 40 to 45° C. and the flask was subsequently maintained under argon backpressure. After 72 hours heating was discontinued at which point the cooled solution was added drop wise to 6 L of mechanically stirred ethyl ether. The precipitate was then isolated by vacuum filtration. The solid was dried in vacuo at 95° C. for a minimum of 18 hours. The solid was reprecipitated by dissolution in 150 mL methanol and drop wise addition into 6 L of stirred ethyl ether. The final polymer mass was determined after vacuum drying at 95° C. to a constant mass.

EXAMPLE 3

Preparation of Methacrylated DMA Macromer

To a 1-L 3-neck round bottom flask containing a magnetic stir bar, water-cooled condenser and thermocouple was added 0.177 g AIBN (0.30-wt % based on total weight of DMA), 4.73 g (10-mol % based on DMA, Aldrich No. M2650) of 2-mercaptoethanol and 60 g of distilled DMA (Aldrich Cat. No. 274135). The mixture was dissolved by the addition of 250 mL of anhydrous THF to the flask. The solution was sparged with argon for at least 10 minutes before gradual heating to 60° C. The sparging was discontinued when the solution reached 40 to 45° C. and the flask was subsequently maintained under argon backpressure. After 72 hours heating was discontinued at which point the RT solution was opened to the atmosphere through a drying tube containing Drierite. Triethylamine (9.70 mL, 1.15 equivalents based on mercaptoethanol, Aldrich Cat. No. 471283) was added to the flask, whereupon some of the dissolved polymer precipitated. The solution was stirred at RT until all of the polymer redissolved. Methacryloyl chloride (6.45 mL, 1.10 equiv., Aldrich Cat. No. 523216) was then added in one portion, and the solution was allowed to stir at RT overnight. Triethylamine hydrochloride was removed from the solution by vacuum filtration. The filtered solution was added dropwise to 6 L of mechanically stirred ethyl ether. The solid was collected by vacuum filtration and the product dried in vacuo at RT for a minimum of 18 hours. The number average molecular weight of methacrylated DMA macromer was estimated to be 1100 Daltons.

EXAMPLE 4

Preparation of DMA Brush Polymer

To a 1-L 3-neck round bottom flask containing a magnetic stir bar, water-cooled condenser and thermocouple was added 0.132 g AIBN (0.28-wt % based on total weight of monomers), 2.10 g (4.5-mol %, Combi-Blocks No. BB-3222) of 3-methacrylamidophenylboronic acid, 25.0 g of the methacrylated DMA macromer of Example 3 (10 mol %), 3.48 g (9.0-mol %, Aldrich Cat. No. 409-472-1L) of deinhibited and distilled DMAPMA and 17.24 g (76.5-mol %, Aldrich Cat. No. 274135-500ML) of distilled DMA. The monomers and initiator were dissolved by addition of 200-mL of methanol to the flask. The solution was sparged with argon for at least 10 minutes before gradual heating to 60° C. The sparging was discontinued when the solution reached 40 to 45° C. and the flask was subsequently maintained under argon backpressure. After 72 hours heating was discontinued, at which point the cooled solution was added drop wise to 6 L of mechanically stirred ethyl ether. The precipitate was isolated by vacuum filtration. The solid was dried in vacuo at 95° C. for a minimum of 18 hours. The solid was then reprecipitated by dissolution in 150-mL methanol and drop wise addition into 6-L of stirred ethyl ether. The final polymer mass was determined after vacuum drying at 95° C. to a constant mass.

EXAMPLE 5

Contact lenses made of Balafilcon A are cast and processed under standard manufacturing procedures. Balafilcon A is a copolymer comprised of 3-[tris(trimethylsiloxy)silyl]propyl vinyl carbamate, N-vinyl-2-pyrrolidone (NVP), 1,3-bis[4-vinyloxycarbonyloxy)but-1-yl]polydimethylsiloxane and N-vinyloxycarbonyl alanine. All Balafilcon A lenses are air-plasma treated prior to exposure to the brush copolymer.

For coating with the brush copolymer of Example 2, each lens is placed in a polypropylene blister package containing 3.8-mL of a 100 or 250 ppm (w/v) solution of the brush copolymer dissolved in borate-buffered saline (BBS) containing 300 ppm EDTA. The blisters are sealed is sealed with foil lidstock and autoclaved at 121° C. for 30 minutes.

EXAMPLE 6

Contact lenses made of Balafilcon A are cast and processed under standard manufacturing procedures. Balafilcon A is a copolymer comprised of 3-[tris(trimethylsiloxy)silyl]propyl vinyl carbamate, N-vinyl-2-pyrrolidone (NVP), 1,3-bis[4-vinyloxycarbonyloxy)but-1-yl]polydimethylsiloxane and N-vinyloxycarbonyl alanine. All Balafilcon A lenses are air-plasma treated prior to exposure to the brush copolymer.

For coating with the brush copolymer of Example 4, each lens is placed in a polypropylene blister package containing 3.8-mL of a 100 or 250 ppm (w/v) solution of the brush copolymer dissolved in borate-buffered saline (BBS) containing 300 ppm EDTA. The blisters are sealed with foil lidstock and autoclaved at 121° C. for 30 minutes.

It will be understood that various modifications may be made to the embodiments disclosed herein. Therefore the above description should not be construed as limiting, but merely as exemplifications of preferred embodiments. For example, the functions described above and implemented as the best mode for operating the present invention are for illustration purposes only. Other arrangements and methods may be implemented by those skilled in the art without departing from the scope and spirit of this invention. Moreover, those skilled in the art will envision other modifications within the scope and spirit of the features and advantages appended hereto.

What is claimed is:

1. A method of preparing a package comprising a storable, sterile ophthalmic device, the method comprising:
    (a) immersing an ophthalmic device in an aqueous packaging solution comprising a brush copolymer prepared by reacting a 3-methacrylamidophenylboronic acid with a methacrylated PVP macromer to provide a hydrophilic polymer intermediate; reacting the hydrophilic polymer intermediate with a triethylamine followed by the reactive addition of a methacryloyl chloride; removal of any Triethylamine hydrochloride formed; and isolation of a methacrylated polymeric backbone formed there by; and reacting the methacrylated polymeric backbone with a 3-methacylamidophenyl boronic acid and a DMA to provide a brush copolymer comprising (i) monomeric units derived from an ethylenically unsaturated monomer containing one or more boronic acid moieties; and (ii) monomeric units derived from an ethylenically unsaturated-containing hydrophilic macromonomer, wherein the solution has an osmolality of at least about 200 mOsm/kg and a pH in the range of about 6 to about 9;
    (b) packaging the solution and the device in a manner preventing contamination of the device by microorganisms; and
    (c) sterilizing the packaged solution and device.

2. The method of claim 1, wherein the ophthalmic device is a contact lens.

3. The method of claim 1, wherein the ophthalmic device is a silicone hydrogel contact lens.

4. The method of claim 1, wherein the brush copolymer has a backbone of the monomeric units derived from an ethylenically unsaturated monomer containing one or more boronic acid moieties; and bristles of the monomeric units derived from an ethylenically unsaturated-containing hydrophilic macromonomer.

5. The method of claim 4, wherein the backbone further comprises monomeric units derived from an ethylenically unsaturated monomer containing a tertiary-amine moiety; and monomeric units derived from an ethylenically unsaturated monomer containing a hydrophilic moiety capable of rendering the copolymer water-soluble.

6. The method of claim 1, wherein the ethylenically unsaturated monomer containing one or more boronic acid moieties comprises an ethylenically unsaturated containing aryl boronic acid.

7. The method of claim 1, wherein the ethylenically unsaturated monomer containing one or more boronic acid moieties is selected from the group consisting of 4-vinylphenylboronic acid, 3-methacrylamidophenylboronic acid, 3-acrylamidophenylboronic acid and mixtures thereof.

8. The method of claim 1, wherein the hydrophilic macromonomer comprises units derived from a hydrophilic monomer selected from the group consisting of an unsaturated carboxylic acid, vinyl lactam, amide, polymerizable amine, vinyl carbonate, vinyl carbamate, oxazolone monomer and mixtures thereof.

9. The method of claim 1, wherein the hydrophilic macromonomer is made using atom transfer radical polymerization (ATRP) or reversible addition-fragmentation chain transfer (RAFT) polymerization.

10. The method of claim 1, wherein the hydrophilic macromonomer has a number average molecular weight of about 500 to about 200,000.

11. The method of claim 1, wherein the brush copolymer further comprises monomeric units derived from an ethylenically unsaturated monomer containing a tertiary-amine moiety.

12. The method of claim 1, wherein the brush copolymer further comprises monomeric units derived from an ethylenically unsaturated monomer containing a hydrophilic moiety capable of rendering the copolymer water-soluble.

13. The method of claim 1, wherein the hydrophilic moiety is derived from a hydrophilic monomer selected from the group consisting of N-vinyl pyrrolidone, N-vinyl-N-methyl acetamide, N,N-dimethyl methacrylamide, N,N-dimethylacrylamide, and mixtures thereof.

14. The method of claim 1, wherein the brush copolymer comprises about 1 to about 20 mole percent of the boronic acid-containing monomeric units, about 1 to about 20 mole percent of the monomeric units derived from an ethylenically unsaturated hydrophilic macromonomer, about 1 to about 20 mole percent of monomeric units derived from an ethylenically unsaturated monomer containing a tertiary-amine moiety, and about 40 to about 90 mole percent of monomeric units derived from an ethylenically unsaturated monomer containing a hydrophilic moiety capable of rendering the copolymer water-soluble.

15. The method of claim 1, wherein the solution does not contain an effective disinfecting amount of a disinfecting agent.

16. The method of claim 1, wherein the solution does not contain a germicide compound.

17. A packaging system for the storage of an ophthalmic device comprising a sealed container containing one or more unused ophthalmic devices immersed in an aqueous packaging solution comprising a brush copolymer prepared by reacting a 3-methacrylamidophenylboronic acid with a methacrylated PVP macromer to provide a hydrophilic polymer intermediate; reacting the hydrophilic polymer intermediate with a triethylamine followed by the reactive addition of a methacryloyl chloride; removal of any Triethylamine hydrochloride formed; and isolation of a methacrylated polymeric backbone formed there by; and reacting the methacrylated polymeric backbone with a 3-methacylamidophenyl boronic acid and a DMA to provide a brush copolymer comprising (i) monomeric units derived from an ethylenically unsaturated monomer containing one or more boronic acid moieties; and (ii) monomeric units derived from an ethylenically unsaturated-containing hydrophilic macromonomer, wherein the solution has an osmolality of at least about 200 mOsm/kg, a pH of about 6 to about 9 and is heat sterilized.

18. The packaging system of claim 17, wherein the ophthalmic device is a contact lens.

19. The packaging system of claim 17, wherein the package is heat sterilized subsequent to sealing of the package and the solution does not contain an effective disinfecting amount of a disinfecting agent or a germicide compound.

20. A packaging system for the storage of an ophthalmic device comprising:
    (a) an aqueous packaging solution comprising a brush copolymer prepared by reacting a 3-methacrylamidophenylboronic acid with a methacrylated PVP macromer to provide a hydrophilic polymer intermediate;

reacting the hydrophilic polymer intermediate with a triethylamine followed by the reactive addition of a methacryloyl chloride; removal of any Triethylamine hydrochloride formed; and isolation of a methacrylated polymeric backbone formed there by; and reacting the methacrylated polymeric backbone with a 3-methacylamidophenyl boronic acid and a DMA to provide a brush copolymer comprising (i) monomeric units derived from an ethylenically unsaturated monomer containing one or more boronic acid moieties; and (ii) monomeric units derived from an ethylenically unsaturated-containing hydrophilic macromonomer, wherein the solution has an osmolality of at east about 200 mOsm/kg and a pH in the range of about 6 to about 9;

(b) at least one ophthalmic device; and (c) a container for holding the solution and ophthalmic device sufficient to preserve the sterility of the solution and ophthalmic device, wherein the solution does not contain an effective disinfecting amount of a disinfecting agent.

* * * * *